United States Patent [19]

Holroyd et al.

[11] Patent Number: 5,781,435
[45] Date of Patent: Jul. 14, 1998

[54] EDIT-TO-IT

[76] Inventors: Delwyn Holroyd, Saith Erw, Gresford Road, Hope, Wrexham, Clwyd LL12 9PW, Wales; John Child, 46 Pembury Road, Tonbridge, Kent TN9 2JE, England; Anita J. Sinclair, 48a Highburg Hill, London, NS, England

[21] Appl. No.: 631,401

[22] Filed: Apr. 12, 1996

[51] Int. Cl.$^6$ .................................................. G11B 27/00
[52] U.S. Cl. ........................... 364/192; 360/13; 364/193; 369/83; 386/4; 386/52; 386/55
[58] Field of Search ......................... 364/192, 193; 358/537, 448, 452; 360/13; 369/83; 382/309; 386/4, 52, 55; 395/328

[56] References Cited

U.S. PATENT DOCUMENTS

| | | | |
|---|---|---|---|
| 5,467,288 | 11/1995 | Fasciano et al. | 365/514 R |
| 5,477,337 | 12/1995 | Schuler | 358/335 |
| 5,488,433 | 1/1996 | Washino et al. | 348/722 |
| 5,517,320 | 5/1996 | Schuler | 358/335 |
| 5,539,527 | 7/1996 | Kajimoto et al. | 358/335 |
| 5,590,262 | 12/1996 | Isadore-Barreca | 395/806 |
| 5,610,653 | 3/1997 | Abecassis | 348/110 |
| 5,625,739 | 4/1997 | Kotani | 386/52 |
| 5,640,320 | 6/1997 | Jackson et al. | 364/192 |
| 5,640,601 | 6/1997 | Peters | 395/854 |
| 5,644,364 | 7/1997 | Kurtze et al. | 348/584 |
| 5,649,046 | 7/1997 | Stewart et al. | 386/52 |
| 5,649,171 | 7/1997 | Craven et al. | 395/500 |

OTHER PUBLICATIONS

Schafer, "Getting the Job Done. How Hybrid Systems Can Increase Your Studio's Productivity", IEE, Sep. 14, 1995.
Alpert et al., "The EFX Editing And Effects Environment", IEEE, 1996.
"Tektronix (India) Launches Range of Digital Video Products in India; Also Launches Entire Range of Non–Linear Editors", Economic Times, Oct. 27, 1995.

*Primary Examiner*—James P. Trammell
*Assistant Examiner*—Patrick Assouad
*Attorney, Agent, or Firm*—Francis I. Gray

[57] ABSTRACT

An edit-to-it function of an editing system allows an editor to combine linear editing with non-linear editing. A linear source, such as a magnetic tape, may be identified as an edit source, as well as already predigitized material. When the linear source is selected as an edit source, an edit-to-it file is created that indicates the status of the source—which portions are already digitized and which are not. The editor identifies an in-point on the edit and an in-point on the source. The source prerolls, as applicable, to the in-point and lays the shot into the edit while simultaneously recording the shot including a handle prior to the in-point into a digital storage device. When the editor identifies the end of the shot, either by a predetermined out-point or on-the-fly, the source stops and the recording terminates. If a portion of the shot is already digitized, as indicated by the edit-to-it file, then the predigitized material is used with a new digitized section being created for the portion of the shot from the source not already digitized.

1 Claim, 5 Drawing Sheets

EDIT-TO-IT

BACKGROUND OF THE INVENTION

The present invention relates to editing systems, and more particularly to an "edit-to-it" feature that minimizes editing time by performing editing and digitization of information simultaneously.

Present non-linear editing systems first log-in material, including video, audio, timecode and/or VITC material, from a source, such as a video/audio tape or a camera/microphone, in a separate process that produces a series of digitized "shots" which are stored as data in a random access medium, such as digital disk storage. Then an editor accesses the digitized shots to perform the edit to produce a final edited program. For off-line editing where time is not of the essence, this process works acceptably. However in certain situations, such as news rooms where material is needed immediately to meet a news program deadline, this off-line process becomes too time consuming.

Therefore what is desired is an editing process that reduces the editing time when using original source material.

SUMMARY OF THE INVENTION

Accordingly the present invention provides an "edit-to-it" feature that allows an editor to edit material directly from an original source while the material selected for the edit is being simultaneously digitized in the background for subsequent editing processes. An editor selects an in-point on an edit and an in-point on the source indicating the beginning of a shot. The editor then selects the desired editing function and the source is prerolled, if necessary, until the in-point on the source is reached. The shot is then included into the edit while simultaneously being recorded into mass storage as a named section of the source. The shot as recorded includes a handle of predetermined duration prior to the in-point to allow for subsequent trimming of the in-point during the edit. The end of the shot is either predetermined by the editor prior to digitization or is identified on-the-fly when the editor commands the source to stop. At this point the edit is complete and the shot has been digitized so that for future edits the predigitized shot may be used rather than reverting to the source again. An edit-to-it file, representing the source, indicates which sections of the source have been digitized, with each section having a unique identifier. If the shot selected by the editor from the source includes both predigitized and undigitized material, the edit-to-it file uses the predigitized material where available and records the portion of the shot not previously digitized.

The objects, advantages and other novel features of the present invention are apparent from the following detailed description when read in conjunction with the appended claims and attached drawing.

DESCRIPTION OF THE PREFERRED EMBODIMENT

Figure 1:
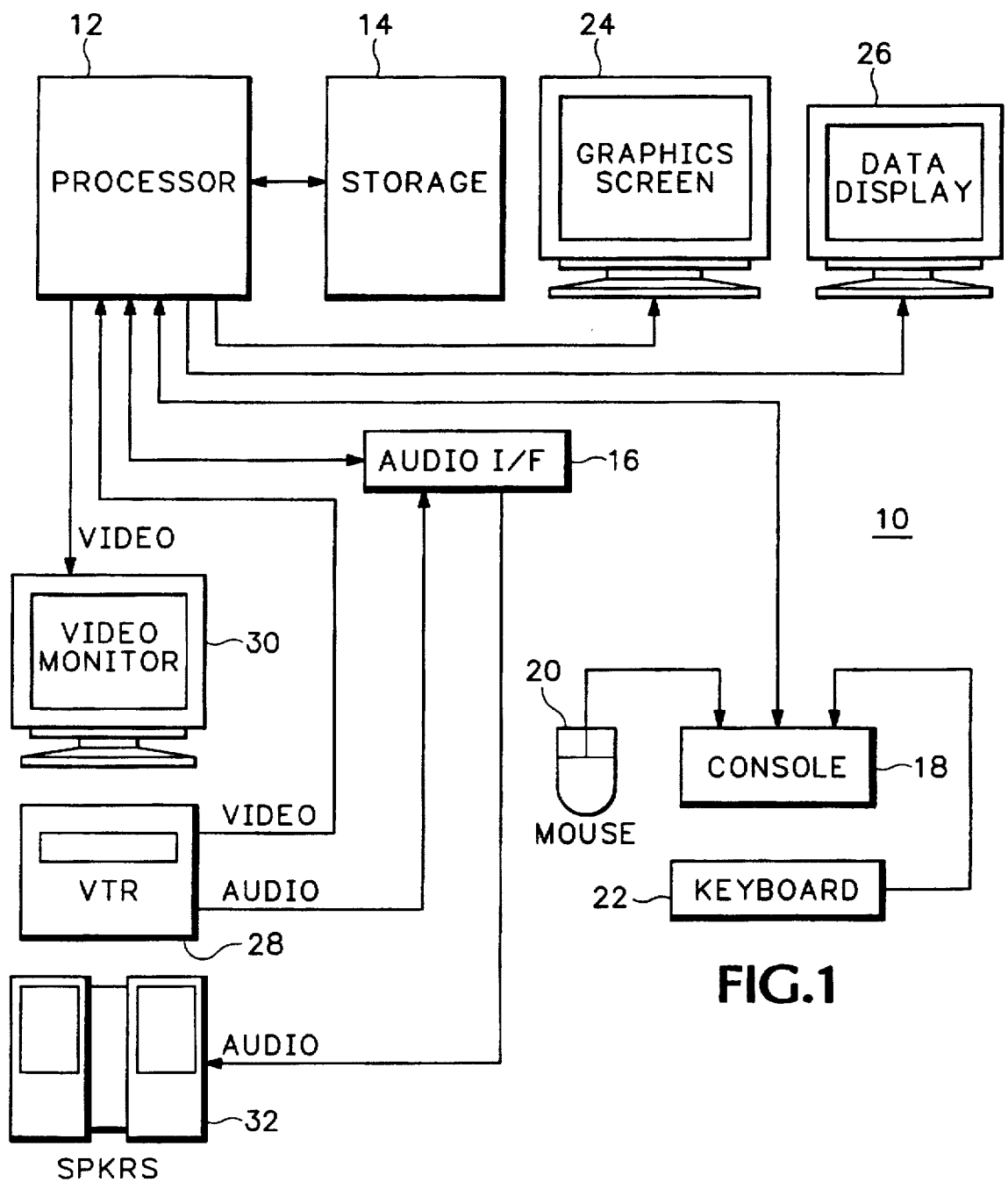
FIG. 1 is a block diagram view of an editing system suitable for performing the "edit-to-it" feature according to the present invention.

Referring now to FIG. 1 an editing system 10 includes a processor unit 12 with an associated mass storage unit 14, such as a digital disk system. Also coupled to the processor unit 12 are input/output devices, such as an audio interface 16 and a control console 18 which receives inputs additionally from auxiliary sources, such as a mouse 20 and a keyboard 22. For display of information a graphics screen 24 and a data display 26 are coupled to the processor unit 12.

The graphics screen 24 provides the main work screen for an edit, with the screen objects used for editing being displayed there along with digitized pictures. The console 18 is the main interface for controlling the playing of source material as well as for performing many of the editing functions. The keyboard 22 is mainly used for typing in logging information about shots and edits, as well as a few editing operations. The mouse 20 is used to control objects on the graphics screen 24. The data display 26 is used for system housekeeping and maintenance operations. The processor unit 12 contains the computers where the internal processing work is performed and where system information is stored, and may house a floppy disk drive and an optical or Exabyte backup device. The audio interface 16 provides balanced audio inputs and outputs. The storage unit 14 stores the digitized material.

Sources of original material, such as video tape recorders (VTRs) 28, cameras or the like, provide material, such as video, timecode and VITC material, to the processor unit 12 and corresponding audio material to the audio interface 16. The audio from the VTR 28 and the edited audio from the processor unit 12 are selectively provided to the audio interface 16 for output on speakers 32, and the video from the VTR 28 and the edited video material also are selectively provided by the processor unit as a video output to a video monitor 30. The timecode and/or VITC information may be provided as an edit list display on the display unit 26. The audio and video outputs also may be provided to another VTR or disk recorder in a desired format to produce an output source for recording the final edited product.

Non-linear editing provides the ability to assemble an edit in any order, and then make changes to any shot at any time. The editing system 10 stores material in digital form in the storage unit 14, which allows for non-linear editing by giving fast access to any frame of the material at any time. To maximize storage capabilities the editing system 10 may compress video for storage in the storage unit 14, with the amount of compression being variable. The audio also is stored as digital samples, usually in an uncompressed format.

As discussed above, normally the various types of material are separately logged into the storage unit 14 as a series of digitized shots which are then available for subsequent non-linear editing. However the present invention allows the editor to take shots directly from a linear source, such as the VTR 28, a camera or the like, and insert the shots directly into the edit, the processor unit 12 performing the digitization of the selected shots in the background simultaneously.

Figure 2:
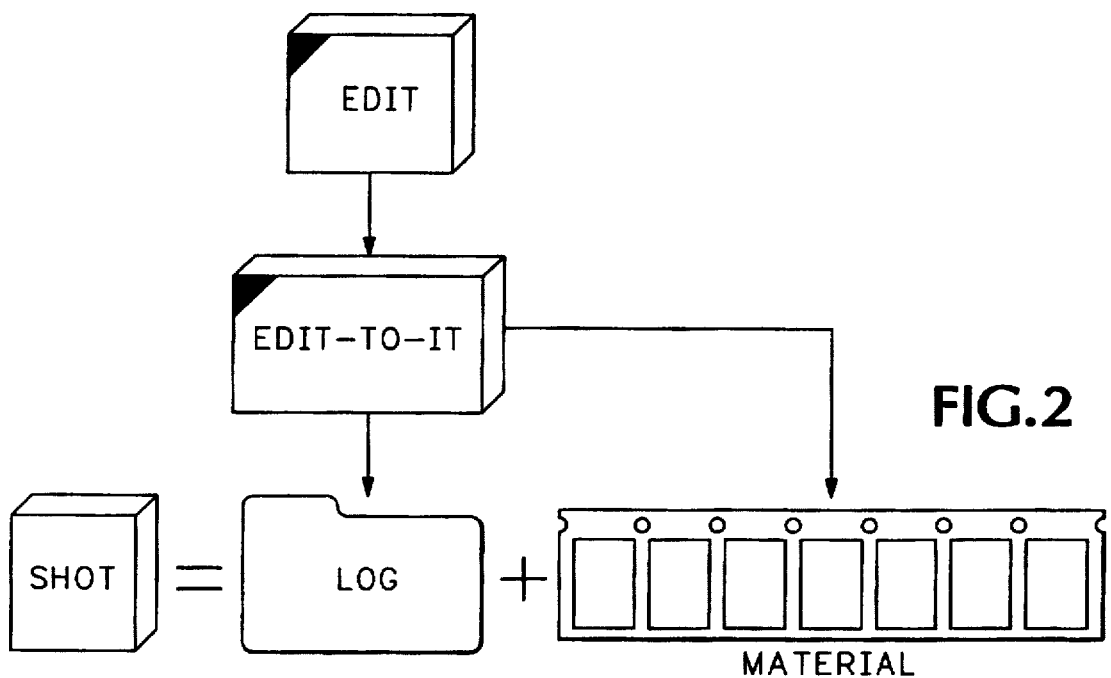
FIG. 2 is a diagram showing the relationship between an edit, an edit-to-it file and a shot according to the present invention.

A "shot" is created by a single continuous recording of material, and is stored as a log file and a material file, as shown in FIG. 2. The log file for a shot contains logging information such as the shot name, reel ID and timecode, while the material file contains material, such as video or audio, for the shot. An "edit-to-it" file is a record which keeps track of the sections of each source that have been digitized, as explained more fully hereafter. The edit-to-it file for each source controls the subsequent use of material from that source, ensuring that predigitized material is used where it exists. This file refers directly to the material for the original shots. Finally an "edit" means any edited sequence of shots. The edit that appears on the graphics screen 24 is simply a list of edit points, without video, audio or timecode. The edit refers to the logs of the shots or to edit-to-it files. When the edit is viewed, the video and audio from the material files of the original shots are played.

Figure 4:
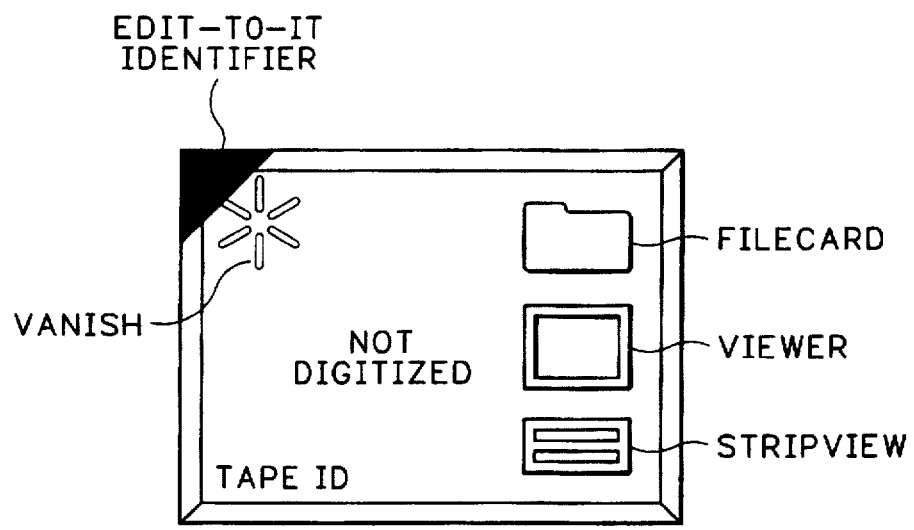
FIG. 4 is a view of a tile object for use by the edit-to-it feature according to the present invention.
Figure 3:
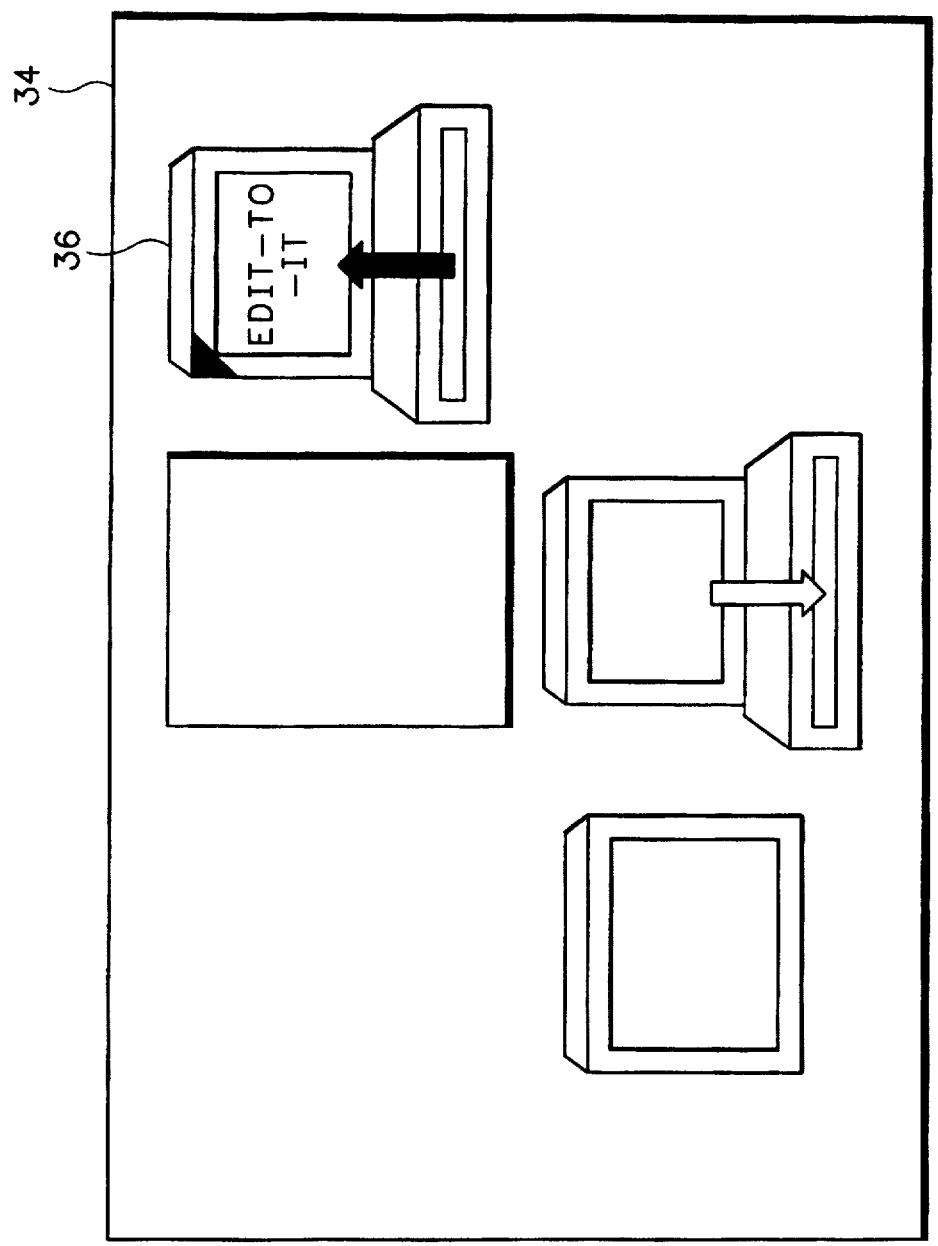
FIG. 3 is a graphic view of a toolbox object including an edit-to-it icon according to the present invention.
Figure 3:
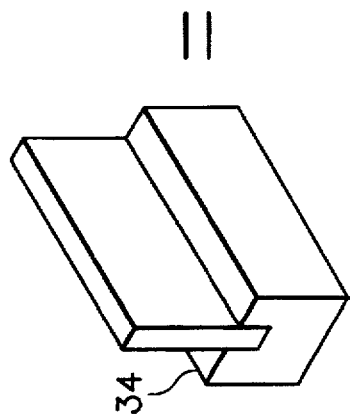
Figure 5:
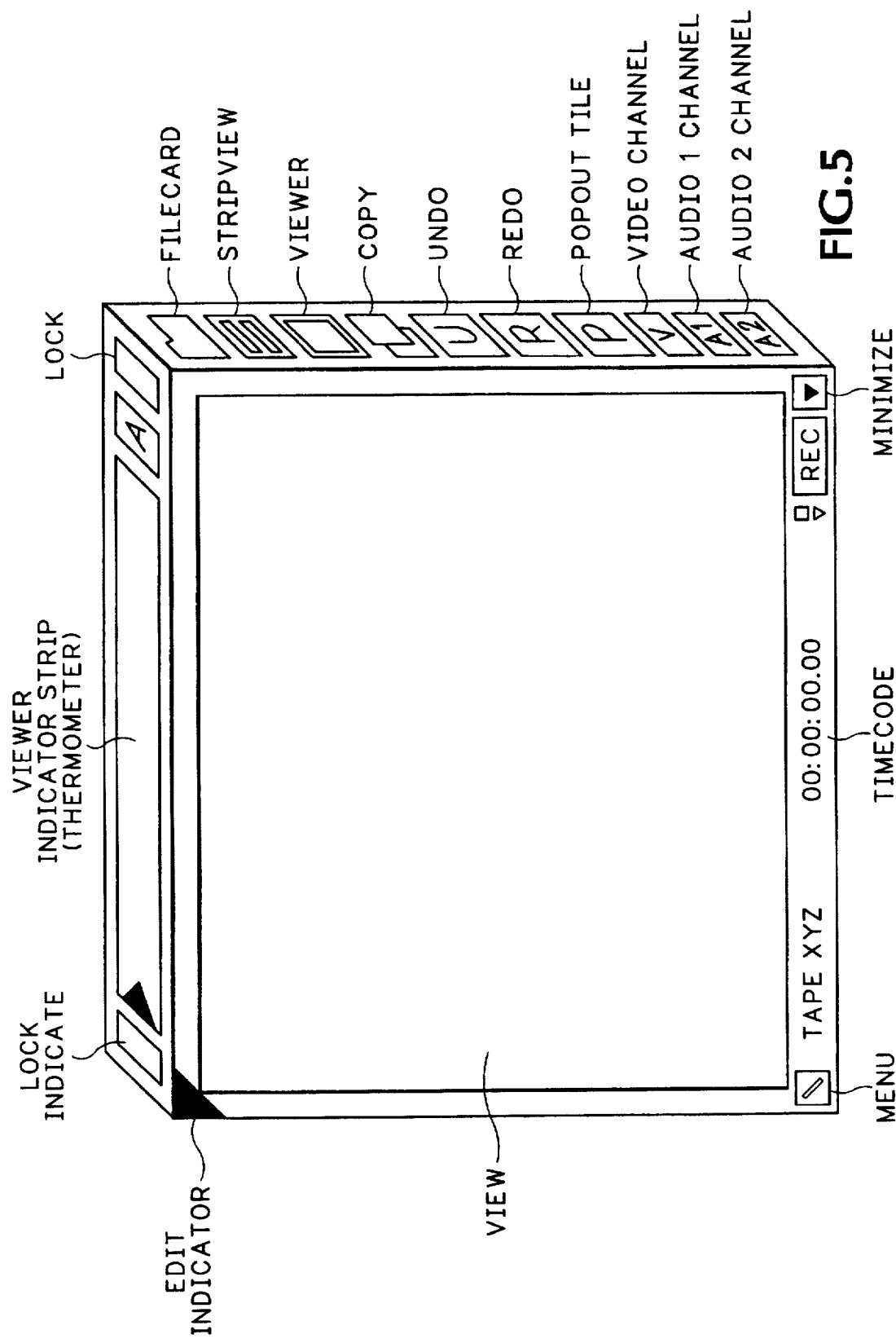
FIG. 5 is a view of a viewer object for use by the edit-to-it feature according to the present invention.

A toolbox 34, as shown in FIG. 3, is provided as an object on the graphics screen 24 and contains many tools that an editor may need in performing an edit. By clicking on the toolbox 34 with the mouse 20 the toolbox is opened and the tools displayed. One of the tools is an edit-to-it tool in the form of an icon 36. When the edit-to-it icon 36 is clicked on by the mouse 20, a tile object, such as that shown in FIG. 4, is displayed to represent a new edit-to-it file. The tile includes a label in the form of a tape reel ID and some control buttons. To perform an edit a record viewer object is created, as shown in FIG. 5, to record the edit session.

Selecting the edit-to-it function by clicking on the edit-to-it icon 36 in the toolbox 34 produces the edit-to-it file tile on the graphics screen 24. A dialog box also is displayed on the screen with a default source reel ID of "???". The editor changes this to a suitable reel ID for the source, such as tape loaded in the VTR 28. The edit-to-it file is given a label based on the reel ID entered. For example, if the reel ID is entered as "007", then the edit-to-it file is given the label "Tape 007". The reel ID entered is used for all shots recorded using this edit-to-it file. This identification is used to label the edit-to-it tile as well as the edit-to-it file. Each shot digitized from any source is given an initial sequential "Section" number as a shot name in the order in which the shots are digitized, such as "Section 2", regardless of the reel ID. The shot names may be subsequently changed as desired by the editor. The controls on the control console 18 are used to control the transport functions of the VTR 28, such as forward play, reverse play, stop, shuttle, fast forward, fast rewind and cue, as well as the edit.

As the edit-to-it function processes the material from the source in the VTR 28, those sections of the source that are designated by the edit controls as required shots are logged automatically and digitized. What is logged, for example, is the incoming timecode, the reel identification of the edit-to-it file, and a section number for each separate shot taken from the tape. Thus using the edit-to-it function two procedures are combined—recording (digitizing into the mass storage unit 14) and editing.

Figure 6:
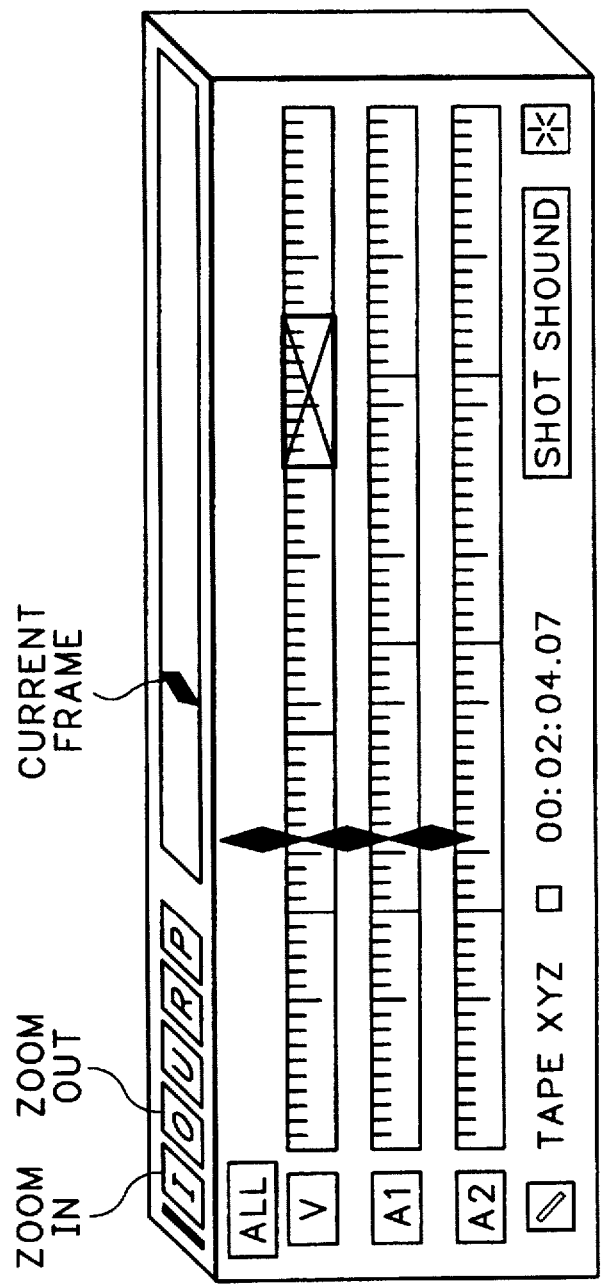
FIG. 6 is a graphic view of a stripview object for an edit-to-it file according to the present invention.

By selecting the stripview button from the edit-to-it tile, a stripview for the edit-to-it file is displayed, similar to that shown in FIG. 6. On the stripview the portions of the source that have been recorded (digitized) are shown with a label (section number) and in a contrasting color/shade. Initially the edit-to-it stripview shows the entire contents or duration of the source. By using the magnification feature on the stripview the editor may zoom in on the particular section which is of interest. Editing on this stripview is performed as normal, using both predigitized material from the mass storage unit 14 and new material from the source. Each time new material is needed from the source the edit-to-it file keeps track of the newly recorded material as another section.

In operation an editor has available material from the source, such as tape in the VTR 28, and material that has already been digitized from the storage unit 14. The editor from the control console 18 and using the mouse 20 selects the edit-to-it function to open a new edit-to-it file with the appropriate source identification, as described above. The editor selects a viewer as the record viewer and selects a source for editing, which source is displayed on the graphics screen 24 as a tile. Many sources may be displayed on the graphics screen 24, one of which is the edit-to-it file tile. When the editor selects the edit-to-it file as the source, the control console 18 becomes the source transport controller, rolling forward or backward as desired along the source material, as well as the edit controller. The video from the source is displayed on the monitor 30 and the audio is played through the speakers 32. The editor rolls the source until a suitable in-point is selected, and the time code for the source for that in-point is stored in the log file, which time code includes a handle that indicates that the beginning of the shot identified by the in-point is actually some predetermined amount of time earlier, such as two seconds. The shot is laid into the edit time track as represented by the stripview, and the out-point is either predetermined by the editor prior to digitization or is indicated on-the-fly by the editor stopping the rolling of the source. When the editor indicates the in-point for the shot, the processor unit 12 records, i.e., digitizes, the shot starting with the handle prior to the in-point into the storage unit 14. Where the out-point is predetermined by the editor, another handle may be added at the end of the shot to allow for trimming of the out-point. When the editor terminates the shot by indicating an out-point, either predetermined or on-the-fly, the processor 12 stops recording and updates the edit-to-it file to indicate what portion of the source has been digitized, giving the shot a section number. The shot is also simultaneously inserted into the edit. The shot, once digitized, can then be trimmed, moved, etc. as part of the continuing editing process.

One type of edit that may be performed is an open-ended replace edit where all the material from the in-point indicated on the record viewer is replaced by all the material from the in-point of the selected source. For predigitized material once the respective in-points are selected, the edit happens instantly. Where the original source is used, the VTR 28 prerolls and then starts playing, and when the source in-point is reached the video, audio, timecode and/or VITC are recorded as the edit is performed. When the editor via the control console 18, either on-the-fly or as marked on the viewing indicator (FIG. 5), indicates the end of the shot, the recording stops and that point becomes the out-point for the shot. If a portion of the source has already been digitized due to an earlier edit-to-it shot selection, then the predigitized portion as indicated by the edit-to-it file is used where available and the newly recorded section is given another section number.

In the same manner an open-ended insert may be made using the edit-to-it function. Once the in-points on the record viewer and the source are located, the source is rolled in response to an "insert" command from the control console 18, and when the source in-point is reached the processor unit 12 records the incoming material. When the "stop" command is activated or the predetermined out-point is reached, the recording stops. All of the edit after the original in-point on the record viewer is moved to be after the out-point of the new shot from the tape.

For mark/park edits a current frame is indicated on the viewer indicator strip on the top of the record viewer when a Mark button is pressed on the control console 18. A mark, either prior to or after the current frame, may also be indicated on the viewer indicator strip using the Mark button. This serves to select this portion of the source as a shot for the edit. If the portion has already been digitized, the shot is instantly accessed from the digital storage device 14. Otherwise the shot is taken from the source and inserted into the edit as well as being digitized for storage. A handle is provided at both the in- and out-points for the shot directly from the source using this "mark and park" editing feature.

When the edit-to-it viewer is selected as the source, the source control is normally ON so that the transport control functions are controlled by the control console 18. However if the source control function is turned OFF, then when the edit-to-it source is accessed, only the already digitized shots are available for the edit, the remaining portion of the source being blank.

Thus as the edit is performed the control console 18 acts as a source transport control as well as an edit control when the material for a shot is not predigitized and the transport control function is ON, keeping track of which portions of the source have already been digitized so that the predigitized shots are used when available and the source material is used otherwise. Therefore the digitization (recording) is performed in the background simultaneously with the editing process.

What is claimed is:

1. A method of editing comprising the steps of:

initiating an edit-to-it file when material from a linear source is required as a source for an edit;

identifying an initial point for a shot on the linear source;

prerolling the linear source until the initial point for the shot is reached;

laying the shot into the edit;

simultaneously recording the material from the linear source into a storage unit starting from a handle prior to the initial point until an end point of the material defining the end of the shot is reached when the edit-to-it file indicates that the shot has not been previously digitized; and updating the edit-to-it file to indicate the portion of the linear source that is recorded in the storage unit.

* * * * *